(12) United States Patent
Kanna et al.

(10) Patent No.: US 11,433,832 B2
(45) Date of Patent: Sep. 6, 2022

(54) GROMMET

(71) Applicants: SUMITOMO WIRING SYSTEMS, LTD., Mie-ken (JP); TOYOTA JIDOSHA KABUSHIKI KAISHA, Aichi-ken (JP)

(72) Inventors: Yusuke Kanna, Yokkaichi (JP); Hiroki Yuasa, Toyota (JP); Isamu Takahashi, Toyota (JP)

(73) Assignees: SUMITOMO WIRING SYSTEMS, LTD., Mie (JP); TOYOTA JIDOSHA KABUSHIKI KAISHA, Aichi (JP)

(*) Notice: Subject to any disclaimer, the term of this patent is extended or adjusted under 35 U.S.C. 154(b) by 0 days.

(21) Appl. No.: 17/460,332

(22) Filed: Aug. 30, 2021

(65) Prior Publication Data

US 2022/0073017 A1 Mar. 10, 2022

(30) Foreign Application Priority Data

Sep. 10, 2020 (JP) .............................. JP2020-152093

(51) Int. Cl.
*B60R 16/02* (2006.01)
(52) U.S. Cl.
CPC .............................. *B60R 16/0222* (2013.01)
(58) Field of Classification Search
CPC ...... H02G 3/22; H02G 3/0462; H02G 3/0481; H02G 3/0468; H02G 3/04; B60R 16/0222; B60R 16/0207; B60R 16/0215
See application file for complete search history.

(56) References Cited

U.S. PATENT DOCUMENTS

| | | | | |
|---|---|---|---|---|
| 7,943,854 | B1* | 5/2011 | Lipp | H02G 11/00 174/152 G |
| 8,420,943 | B1* | 4/2013 | La | B60R 16/0222 174/152 G |
| 8,648,259 | B2* | 2/2014 | Gniewek | H02G 3/0468 174/152 G |
| 9,096,185 | B2 | 8/2015 | Fujita et al. | |
| 2003/0061680 | A1* | 4/2003 | Uchida | B60R 16/0222 16/2.1 |
| 2005/0253384 | A1* | 11/2005 | Taira | B60S 1/48 285/149.1 |
| 2010/0000764 | A1* | 1/2010 | Suzuki | H02G 3/0468 174/152 G |
| 2010/0025077 | A1* | 2/2010 | Ujita | B60R 16/0222 174/153 G |

(Continued)

*Primary Examiner* — Hoa C Nguyen
*Assistant Examiner* — Amol H Patel

(57) ABSTRACT

When not in use and axis of a grommet is straight, a grommet entire length is 120% or greater and 150% or less of a distance from a through hole of a body panel to an opposing member, an accordion sleeve outer diameter is 37% or greater and 42% or less of the grommet entire length, an accordion sleeve length is 50% or greater and 55% or less of the grommet entire length, an accordion sleeve pitch is 12% or greater and 17% or less of the accordion sleeve length. When in use and the grommet is bent, an angle between opening directions of first and second openings is ninety degrees or greater, and a grommet length in the opening direction of the second opening is 82% or greater and 87% or less of the distance from the through hole of the body panel to the opposing member.

3 Claims, 2 Drawing Sheets

(56) References Cited

U.S. PATENT DOCUMENTS

| | | | |
|---|---|---|---|
| 2010/0147557 A1* | 6/2010 | Suzuki | B60R 16/0222 |
| | | | 174/153 G |
| 2013/0180759 A1* | 7/2013 | Gniewek | H02G 3/0468 |
| | | | 174/152 G |
| 2013/0199823 A1* | 8/2013 | Kanai | H02G 3/22 |
| | | | 174/152 G |
| 2018/0222405 A1* | 8/2018 | Baydoun | B60R 16/0222 |
| 2019/0039540 A1* | 2/2019 | Kotani | B60J 5/04 |
| 2019/0045678 A1* | 2/2019 | Ito | H02G 3/03 |
| 2019/0111867 A1* | 4/2019 | Ogawa | B60R 16/0222 |
| 2019/0111868 A1* | 4/2019 | Ogawa | B60R 16/0222 |
| 2019/0111869 A1* | 4/2019 | Ogawa | B60R 16/0222 |
| 2020/0231102 A1* | 7/2020 | Nakai | B60R 16/0222 |
| 2020/0263811 A1* | 8/2020 | Lepper | F16L 5/10 |

\* cited by examiner

GROMMET

BACKGROUND

1. Field

The following description relates to a grommet.

2. Description of Related Art

Japanese Laid-Open Patent Publication No. 2014-138519 discloses an example of a grommet. The grommet is arranged in a through hole of a vehicle body panel. The grommet is tubular. A wire harness is inserted through the grommet for passage through the through hole of the body panel. The grommet includes a first end, which is one end in the axial direction, and a second end, which is the other end in the axial direction. The second end of the grommet is fixed at the through hole to the body panel. The first end of the grommet is a free end that is not fixed to the body panel. The second end of the grommet seals the through hole of the body panel. This allows the through hole of the body panel to be impervious to water.

The wire harness extends out of the openings in the first and second ends of the grommet. The grommet is bent so that the open direction of the first end of the grommet intersects the open direction of the second end of the grommet. This draws the wire harness out of the first end of the grommet relatively parallel to the body panel. This structure allows the wire harness to be drawn out of the first end of the grommet without interfering with a member located in the proximity of the through hole of the body panel.

SUMMARY

Such a grommet is designed having a shape bent to the first end of the grommet in accordance with the direction in which the wire harness is drawn out of the grommet. This results in the necessity to design differently-shaped grommets in accordance with, for example, vehicle specifications. Thus, such a grommet lacks versatility. The grommet can be versatile if it is shaped to be straight when not in use and bent and deformed when in use. However, when the grommet is bent and deformed for use, the second end of the grommet may also be deformed. This may lower the water resistance of the second end of the grommet, which seals the through hole. A highly-rigid resin inner member or the like can be attached to the second end of the grommet to limit deformation of the second end of the grommet. However, the additional member will increase the number of parts.

Accordingly, one objective is to provide a grommet that maintains the water resistance without increasing the number of parts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a tubular grommet is provided that is used in a state fixed to a body panel of a vehicle via a through hole in the body panel and located between the body panel and an opposing member, which is faced toward the through hole. The grommet includes a first end, a second end, and an accordion sleeve. The first end includes a first opening. The second end includes a second opening and is fixed to the body panel in the through hole. The accordion sleeve has an accordion structure extending between the first opening and the second opening. When the grommet is not in use and thus the second end is not fixed to the body panel in the through hole and an axis of the grommet is straight, the grommet has an entire length in a direction of the axis of the grommet that is greater than or equal to 120% and less than or equal to 150% of a distance from the through hole to the opposing member. When the grommet is not in use, the accordion sleeve has an outer diameter about the axis of the grommet that is greater than or equal to 37% and less than or equal to 42% of the entire length of the grommet. When the grommet is not in use, the accordion sleeve has a length in the direction of the axis of the grommet that is greater than or equal to 50% and less than or equal to 55% of the entire length of the grommet. When the grommet is not in use, the accordion structure of the accordion sleeve has a pitch that is greater than or equal to 12% and less than or equal to 17% of the length of the accordion sleeve in the direction of the axis of the grommet. When the grommet is in use and thus the second end is fixed to the body panel in the through hole and the grommet is bent such that the axis of the grommet is not straight, an angle between an opening direction of the first opening and an opening direction of the second opening is greater than or equal to ninety degrees. When the grommet is in use, the grommet has a length in the opening direction of the second opening that is greater than or equal to 82% and less than or equal to 87% of the distance from the through hole to the opposing member.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

EMBODIMENT OF THE DISCLOSURE

Figure 1:
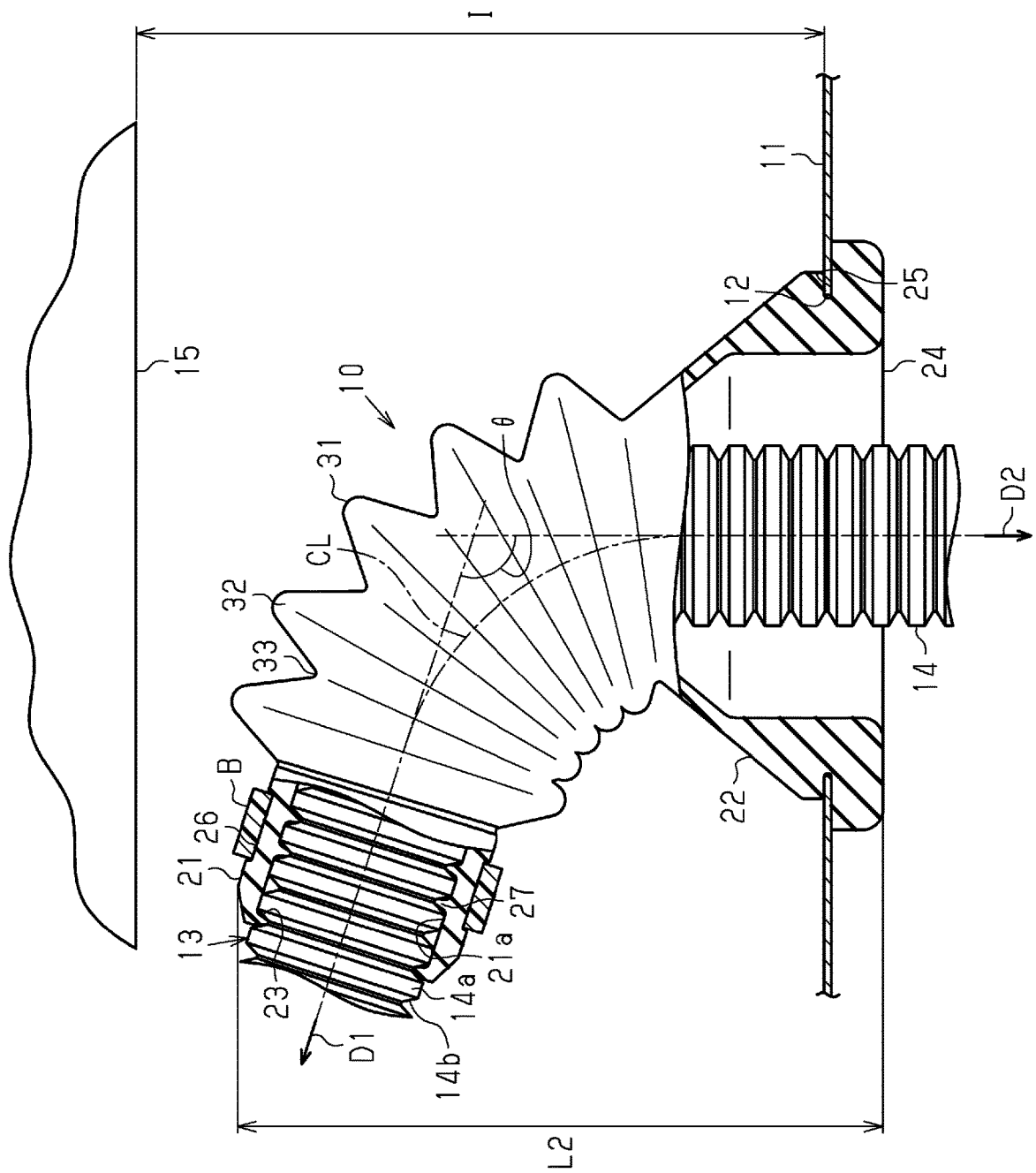
FIG. 1 is a cross-sectional view of a grommet in accordance with an embodiment when in use.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Description of Embodiment of Present Disclosure

The embodiment of the present disclosure will now be described.

(1) A tubular grommet in accordance with the present disclosure is used in a state fixed to a body panel of a vehicle via a through hole in the body panel and located between the body panel and an opposing member, which is faced toward the through hole. The grommet includes a first end, a second end, and an accordion sleeve. The first end includes a first opening. The second end includes a second opening and is fixed to the body panel in the through hole. The accordion sleeve has an accordion structure extending between the first opening and the second opening. When the grommet is not in use and thus the second end is not fixed to the body panel in the through hole and an axis of the grommet is straight, the grommet has an entire length in a direction of the axis of the grommet that is greater than or equal to 120% and less than or equal to 150% of a distance from the through hole to the opposing member. When the grommet is not in use, the accordion sleeve has an outer diameter about the axis of the grommet that is greater than or equal to 37% and less than or equal to 42% of the entire length of the grommet. When the grommet is not in use, the accordion sleeve has a length in the direction of the axis of the grommet that is greater than or equal to 50% and less than or equal to 55% of the entire length of the grommet. When the grommet is not in use, the accordion structure of the accordion sleeve has a pitch that is greater than or equal to 12% and less than or equal to 17% of the length of the accordion sleeve in the direction of the axis of the grommet. When the grommet is in use and thus the second end is fixed to the body panel in the through hole and the grommet is bent such that the axis of the grommet is not straight, an angle between an opening direction of the first opening and an opening direction of the second opening is greater than or equal to ninety degrees. When the grommet is in use, the grommet has a length in the opening direction of the second opening that is greater than or equal to 82% and less than or equal to 87% of the distance from the through hole to the opposing member.

With this structure, the accordion sleeve can be bent and deformed with a margin when in use. This keeps the through hole impervious to water when the accordion sleeve is deformed when in use since deformation of the second end of the grommet can be avoided. Therefore, an additional member for restricting deformation of the second end of the grommet is not necessary to keep the through hole impervious to water.

Further, with the above structure, in a state in which the grommet is located between the body panel and the opposing member, the grommet is sufficiently distanced from the opposing member. This avoids interference of the grommet with the opposing member. Thus, the wire harness, which is inserted through the grommet, does not interfere with the opposing member.

(2) The first end of the grommet includes an outer circumferential surface, and the outer circumferential surface of the first end includes a groove that receives a fastening band.

With this structure, when the fastening band is arranged in the groove in the outer circumferential surface of the first end, the fastening band is engageable with the side walls of the groove. This restricts displacement of the fastening band.

(3) The first end of the grommet includes an inner circumferential surface, and a projection projects from the inner circumferential surface of the first end at a portion corresponding to where the groove is formed.

With this structure, the projection arranged on the inner circumferential surface of the first end of the grommet can be pressed against the outer circumferential surface of the wire harness, which extends through the grommet. This ensures that the gap between the outer circumferential surface of the wire harness and the inner circumferential surface of the first end of the grommet is impervious to water.

Detailed Description of Embodiment of Present Disclosure

A specific example of the grommet in accordance with the present disclosure will now be described with reference to the drawings. To facilitate understanding, configurations may be partially exaggerated or simplified in the drawings. Further, elements in the drawings may not be to scale. The present invention is not limited to the illustrated embodiments and intended to be defined by the claims and their equivalents, and all variations within the scope of the claims and their equivalents.

The term "tubular" as used in this description is not limited to a structure formed by a circumferential wall that extends continuously to be closed in the circumferential direction and also include tubular structures formed by combining multiple parts or a structure that is C-shaped and open in a circumferential direction. Tubular shapes include circular, elliptic, and polygonal shapes. A polygonal shape may have sharp or rounded corners. The term "annular" as used in this description may refer to the shape of any structure that is looped, continuous and endless, or C-shaped with a gap. Annular shapes include, but are not limited to, circular, elliptic, and polygonal shapes. A polygonal shape may have sharp or rounded corners.

As shown in FIG. 1, a grommet 10 in accordance with the present embodiment is fixed to a body panel 11 of a vehicle via a through hole 12 in the body panel 11. The grommet 10 is tubular. A wire harness 13 is inserted through the grommet 10. The wire harness 13 extends through the through hole 12. The wire harness 13 includes one or more electric wires. Further, the wire harness 13 includes a tubular shield 14 that encloses the electric wires.

An opposing member 15 is located in the proximity of the body panel 11. The through hole 12 of the body panel 11 is open toward the opposing member 15. The grommet 10 is located between the body panel 11 and the opposing member 15. The opposing member 15 is any member facing the body panel 11 at the through hole 12. The opposing member 15 is, for example, a tool accommodation portion of a vehicle. The body panel 11 is flat around the through hole 12.

Structure of Grommet 10

Figure 2:
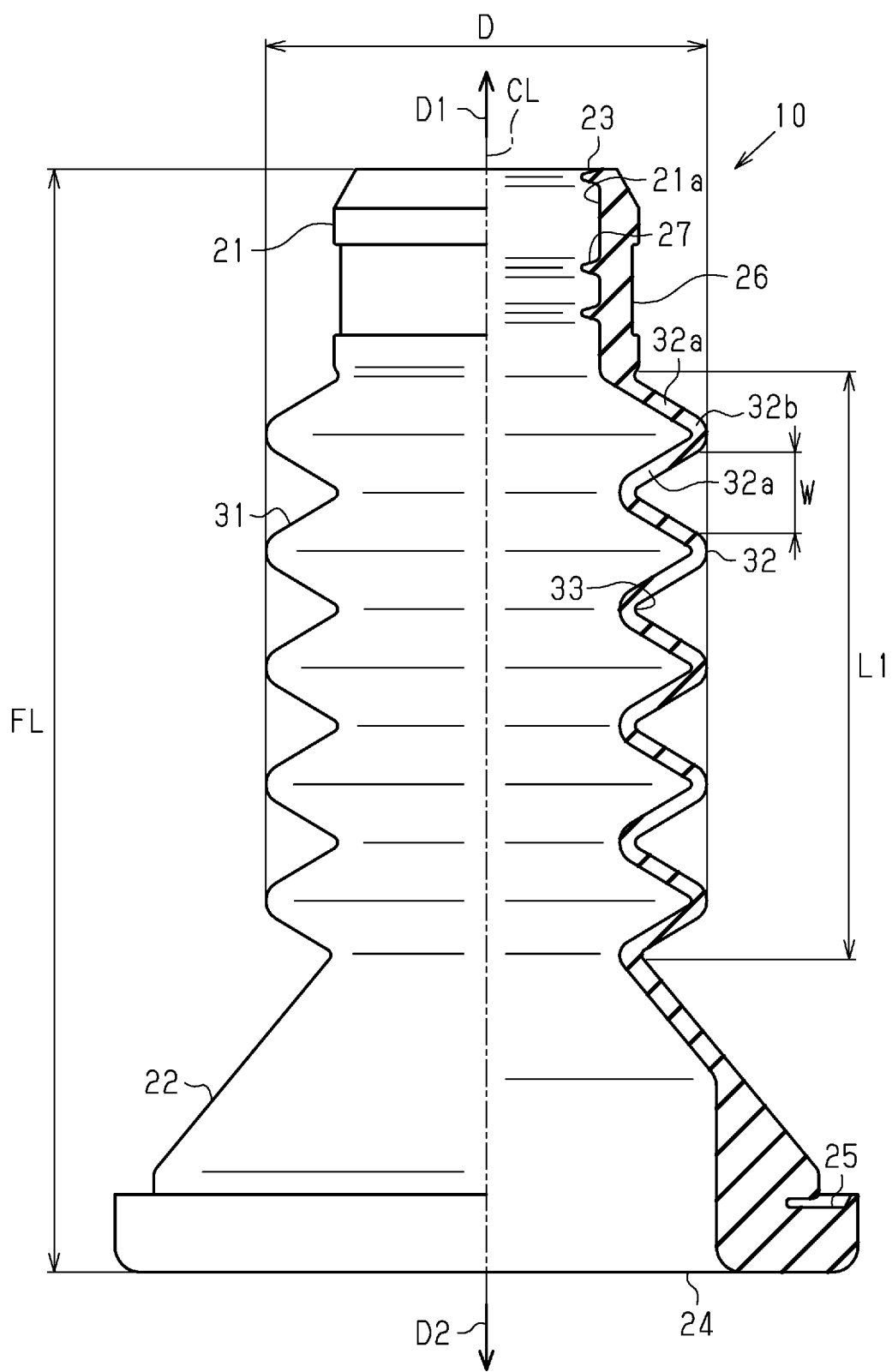
FIG. 2 is a partially cross-sectional view of the grommet when not in use.

FIG. 2 shows the grommet 10 when not in use. When not in use, the axis CL of the tubular grommet 10 is straight. Further, when not in use, the grommet 10 is not fixed to the body panel 11. The grommet 10 is formed from a flexible material. The material for the grommet 10 may be an ethylene propylene diene monomer (EPDM) rubber.

The grommet 10 includes a first end 21 at one end in the axial direction and a second end 22 at the other end in the axial direction. The first end 21 has a transverse cross section that is annular. Further, the second end 22 has a transverse cross section that is annular. The first end 21 includes a first opening 23. The second end 22 includes a second opening 24.

The second end 22 includes a fixing portion 25 that is fixed to the body panel 11 in the through hole 12. The fixing portion 25 includes, for example, a groove that receives the wall around the through hole 12. As shown in FIG. 1, the fixing portion 25 is arranged to be in contact with the wall around the through hole 12. This seals of the gap between the wall around the through hole 12 and the fixing portion 25 to be impervious to water. The second end 22 includes, for example, an outer circumferential surface of which the diameter increases toward the fixing portion 25.

An outer circumferential surface of the first end 21 of the grommet 10 includes, for example, an annular groove 26. The center of the groove 26 coincides with the axis CL of the grommet 10. The groove 26 extends, for example, throughout the entire circumference of the first end 21. A fastening band B shown in FIG. 1 is arranged in the groove 26.

An inner circumferential surface 21a of the first end 21 includes, for example, projections 27 projecting from a portion corresponding to where the groove 26 is formed. The projection 27 is annular and extends in a circumferential direction of the grommet 10. The projection 27 is engaged with the wire harness 13. For example, the projections 27 are arranged next to one another in the axial direction of the grommet 10.

As shown in FIG. 2, the grommet 10 includes an accordion sleeve 31 extending between the first opening 23 and the second opening 24. The accordion sleeve 31 is, for example, tubular and extends about the axis CL of the grommet 10. The accordion sleeve 31 has an accordion structure in which a ridge 32 and a valley 33 are alternately arranged in the axial direction of the grommet 10. The ridge 32 and the valley 33 are each annular in the circumferential direction of the grommet 10. The accordion sleeve 31 includes a plurality of ridges 32 and a plurality of valleys 33. The ridges 32 may have the same shape as each other. Further, the valleys 33 may have the same shape as each other. Each ridge 32 includes a straight part 32a and a curved part 32b. The straight part 32a extends straight. The curved part 32b is curved from the outer circumferential end of the straight part 32a. The curved part 32b forms the peak of the ridge 32. Each ridge 32 is formed by a single curved part 32b including the peak and two straight parts 32a arranged on opposite sides of the curved part 32b in the direction of the axis CL of the grommet 10.

Dimensions of Grommet 10 When Not in Use

As shown in FIG. 2, when the grommet 10 is not in use, the fixing portion 25 is not fixed in the through hole 12. When the grommet 10 is not in use, the axis CL of the grommet 10 is straight. Specifically, when the grommet 10 is arranged so that an opening direction D2 of the second opening 24 coincides with the vertical direction, the axis CL of the grommet 10 extends straight in the vertical direction. Further, when the grommet 10 is not in use, the first opening 23 is aligned with the second opening 24 in an opening direction D1 of the first opening 23. Furthermore, when not in use, the opening direction D1 of the first opening 23 and the opening direction D2 of the second opening 24 are parallel and opposite. In the description hereafter, a state in which the grommet 10 is not in use may simply be referred to as "the non-use state".

As shown in FIG. 2, in the non-use state of the grommet 10, the entire length FL of the grommet 10 is greater than or equal to 120% and less than or equal to 150% of a distance I shown in FIG. 1.

As shown in FIG. 2, the entire length FL of the grommet 10 in the non-use state is the entire length of the grommet 10 in the direction of the axis CL of the grommet 10. The entire length FL of the grommet 10 is the length from the first opening 23 to the second opening 24. The entire length FL of the grommet 10 is set to, for example, 85.1 mm. The direction of the axis CL of the grommet 10 may simply be referred to as "the axial direction".

The distance I shown in FIG. 1 is the distance from the through hole 12, that is, where the grommet 10 is attached to the body panel 11, to the opposing member 15. More specifically, the distance I is the distance from the through hole 12 to the opposing member 15 in the opening direction of the through hole 12. The opposing member 15 is, for example, one of the vehicle parts, and the distance I is a predetermined distance. The distance I is set to, for example, 68.1 mm. Thus, in the present embodiment, the entire length FL of the grommet 10 is set to 125.0% of the distance I.

As shown in FIG. 2, in the non-use state of the grommet 10, the outer diameter D of the accordion sleeve 31 about the axis CL of the grommet 10 is greater than or equal to 37% and less than or equal to 42% of the entire length FL of the grommet 10. The outer diameter D of the accordion sleeve 31 is the diameter of the accordion sleeve 31 and the length of the accordion sleeve 31 in a direction orthogonal to the axis CL of the grommet 10. Further, the outer diameter D of the accordion sleeve 31 is the diameter of the outer surface at the peak of the ridge 32. The outer diameter D of the accordion sleeve 31 is set to, for example, 34.0 mm. Thus, the outer diameter D of the accordion sleeve 31 is set to 40.0% of the entire length FL of the grommet 10.

Also, in the non-use state of the grommet 10, the length L1 of the accordion sleeve 31 in the axial direction is greater than or equal to 50% and less than or equal to 55% of the entire length FL of the grommet 10. The length L1 of the accordion sleeve 31 is, for example, the length from the valley 33 located at one end in the axial direction to the valley 33 located at the other end in the axial direction. The length L1 of the accordion sleeve 31 is set to, for example, 45.0 mm. Thus, the length L1 of the accordion sleeve 31 is set to 52.9% of the entire length FL of the grommet 10.

Furthermore, in the non-use state of the grommet 10, the pitch W in the accordion structure of the accordion sleeve 31 is greater than or equal to 12% and less than or equal to 17% of the length L1 of the accordion sleeve 31. The pitch W is the interval of the ridges 32 in the axial direction. The pitch W is, for example, the interval of two adjacent ridges 32 between the boundaries of the straight part 32a and the curved part 32b in the axial direction. The pitch W is set to, for example, 6.3 mm. Thus, the pitch W is set to 14.0% of the length L1 of the accordion sleeve 31.

Grommet 10 When in Use

FIG. 1 shows the grommet 10 when in use. The grommet 10 is arranged in a vehicle when in use. When in use, the fixing portion 25 is fixed in the through hole 12. Also, when in use, the grommet 10 is bent, and the axis CL is not straight. In the description hereafter, a state in which the grommet 10 is in use may simply be referred to as "the used state".

In the used state of the grommet 10, the opening direction D1 of the first opening 23 is not parallel to the opening direction D2 of the second opening 24. In the used state of the grommet 10, the angle θ between the opening direction D1 of the first opening 23 and the opening direction D2 of the second opening 24 is greater than or equal to ninety degrees.

Further, in the used state of the grommet 10, the length L2 of the grommet 10 in the opening direction D2 of the second opening 24 is greater than or equal to 82% and less than or equal to 87% of the distance I. The length L2 of the grommet 10 is the length from the second opening 24 to the top of the first end 21 in the opening direction D2 of the second opening 24. The top of the first end 21 is the part of the first end 21 that is the closest to the opposing member 15. The length L2 of the grommet 10 is set to, for example, 58.0 mm. Thus, the length L2 of the grommet 10 is set to 85.2% of the distance I.

In the used state of the grommet 10, the wire harness 13 is inserted through the grommet 10. Then, the first end 21 of the grommet 10 is fastened by the annular band B from the outer circumferential side. Specifically, the band B presses the inner circumferential surface of the first end 21 against the portion of the shield 14 located in the first end 21. Thus, the inner circumferential surface of the first end 21 comes into contact with the outer circumferential surface of the shield 14 of the wire harness 13. The band B is arranged in the groove 26 of the first end 21. Thus, the band B is engageable with the side walls of the groove 26 in the longitudinal direction of the wire harness 13. The groove 26 restricts displacement of the band B in the longitudinal direction of the wire harness 13.

The projections 27 arranged on the first end 21 of the grommet 10 are pressed against the outer circumferential surface of the shield 14 of the wire harness 13. This further ensures that the gap between the shield 14 and the inner circumferential surface of the first end 21 is impervious to water.

The shield 14 is formed by, for example, a corrugated tube. The shield 14, which is a corrugated tube, includes an accordion structure in which ridges 14a and valleys 14b are alternately arranged in a longitudinal direction of the shield 14. Each of the ridges 14a and the valleys 14b is, for example, annular in a circumferential direction of the shield 14. The projections 27 of the first end 21 are, for example, fitted into the valleys 14b of the shield 14. In other words, the projections 27 are engaged with the valleys 14b in the longitudinal direction of the shield 14. This restricts relative movement between the shield 14 and the first end 21 of the grommet 10 in the longitudinal direction of the shield 14.

The operation of the present embodiment will now be described.

As shown in FIG. 1, in the used state of the grommet 10, the second end 22 of the grommet 10 is fixed to the body panel 11 via the through hole 12 in the body panel 11. The wire harness 13 is inserted through the through hole 12 and into the grommet 10. The accordion sleeve 31 of the grommet 10 is bent along the route of the wire harness 13. In this case, the bending angle of the accordion sleeve 31, that is, the angle θ between the opening direction D1 of the first opening 23 and the opening direction D2 of the second opening 24 is greater than or equal to ninety degrees. This limits deformation of the accordion sleeve 31, which, in turn, limits deformation of the fixing portion 25 that would result from the deformation of the accordion sleeve 31. Further, the relationship of the entire length FL of the grommet 10, the outer diameter D of the accordion sleeve 31, the length L1 of the accordion sleeve 31, and the pitch W of the accordion sleeve 31 in the non-use state of the grommet 10 allows the accordion sleeve 31 to be deformed with a margin in the used state of the grommet 10.

Furthermore, the bending angle of the accordion sleeve 31 in the used state of the grommet 10 is set to ninety degrees or greater, and the length L2 of the grommet 10 in the used state of the grommet 10 is 87% or less of the distance I from the through hole 12 to the opposing member 15. Thus, there is enough space between the grommet 10 and the opposing member 15 to avoid interference of the grommet 10 and the wire harness 13 with the opposing member 15 taking into consideration dimensional tolerance of the grommet 10 and the body panel 11.

The present embodiment has the following advantages.

(1) By setting the entire length FL of the grommet 10, the outer diameter D of the accordion sleeve 31, the length L1 of the accordion sleeve 31, and the pitch W of the accordion sleeve 31 in the non-use state of the grommet 10 as described in the above embodiment, the accordion sleeve 31 can be bent and deformed with a margin in the used state of the grommet 10. This keeps the through hole 12 impervious to water when the accordion sleeve 31 is deformed in the used state of the grommet 10 since deformation of the second end 22 can be avoided. Therefore, an additional member for restricting deformation of the second end 22 is not necessary to keep the through hole 12 impervious to water.

Further, in the above embodiment, when the grommet 10 is bent in the used state of the grommet 10, the angle θ between the opening direction D1 of the first opening 23 and the opening direction D2 of the second opening 24 is greater than or equal to ninety degrees, and the length L2 of the grommet 10 in the opening direction D2 of the second opening 24 is greater than or equal to 82% and less than or equal to 87% of the distance I. With this structure, in the used state in which the grommet 10 is located between the body panel 11 and the opposing member 15, the grommet 10 is sufficiently spaced apart from the opposing member 15. This avoids interference of the grommet 10 with the opposing member 15. Thus, the wire harness 13, which is inserted through the grommet 10, does not interfere with the opposing member 15.

(2) The outer circumferential surface of the first end 21 of the grommet 10 includes the groove 26 that receives the fastening band B. With this structure, when the fastening band B is arranged in the groove 26 in the outer circumferential surface of the first end 21, the fastening band B is engageable with the side walls of the groove 26. This restricts displacement of the fastening band B.

(3) The projections 27 project from the inner circumferential surface 21a of the first end 21 at a portion corresponding to where the groove 26 is formed. With this structure, the projections 27 arranged on the inner circumferential surface 21a of the first end 21 can be pressed against the outer circumferential surface of the wire harness 13, which extends through the grommet 10. This further ensures that the gap between the outer circumferential surface of the wire harness 13 and the inner circumferential surface 21a of the first end 21 is impervious to water.

The present embodiment may be modified as follows. The present embodiment and the following modifications can be combined as long as the combined modifications are technically acceptable.

In the above embodiment, the groove 26 and the projections 27 may be omitted from the grommet 10.

The structure, such as the shape, of each of the first end 21 and the second end 22 of the grommet 10 is not limited to that described in the above embodiment and may be changed.

The entire length FL of the grommet 10, the outer diameter D of the accordion sleeve 31, the length L1 of the accordion sleeve 31, and the pitch W of the accordion sleeve 31 in the non-use state of the grommet 10 are not limited to the specific dimensions described in the above embodiment and may be changed within the ranges described in the above embodiment. Also, the angle θ and the length L2 of the grommet 10 in the used state of the grommet 10 are not limited to the description of the above embodiment and may be changed within the ranges described in the above embodiment.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A tubular grommet used in a state fixed to a body panel of a vehicle via a through hole in the body panel and located between the body panel and an opposing member, which is faced toward the through hole, the grommet comprising:
   a first end including a first opening;
   a second end including a second opening and fixed to the body panel in the through hole; and
   an accordion sleeve having an accordion structure extending between the first opening and the second opening, wherein
   when the grommet is not in use and thus the second end is not fixed to the body panel in the through hole and an axis of the grommet is straight, the grommet has an entire length in a direction of the axis of the grommet that is greater than or equal to 120% and less than or equal to 150% of a distance from the through hole to the opposing member,
   when the grommet is not in use, the accordion sleeve has an outer diameter about the axis of the grommet that is greater than or equal to 37% and less than or equal to 42% of the entire length of the grommet,
   when the grommet is not in use, the accordion sleeve has a length in the direction of the axis of the grommet that is greater than or equal to 50% and less than or equal to 55% of the entire length of the grommet,
   when the grommet is not in use, the accordion structure of the accordion sleeve has a pitch that is greater than or equal to 12% and less than or equal to 17% of the length of the accordion sleeve in the direction of the axis of the grommet,
   when the grommet is in use and thus the second end is fixed to the body panel in the through hole and the grommet is bent such that the axis of the grommet is not straight, an angle between an opening direction of the first opening and an opening direction of the second opening is greater than or equal to ninety degrees, and
   when the grommet is in use, the grommet has a length in the opening direction of the second opening that is greater than or equal to 82% and less than or equal to 87% of the distance from the through hole to the opposing member.

2. The grommet according to claim 1, wherein
   the first end of the grommet includes an outer circumferential surface, and
   the outer circumferential surface of the first end includes a groove that receives a fastening band.

3. The grommet according to claim 2, wherein
   the first end of the grommet includes an inner circumferential surface, and
   a projection projects from the inner circumferential surface of the first end at a portion corresponding to where the groove is formed.

* * * * *